United States Patent [19]
Mucheyer et al.
[11] Patent Number: 4,562,862
[45] Date of Patent: Jan. 7, 1986

[54] HYDRAULICALLY UNBLOCKABLE NON-RETURN VALVE

[75] Inventors: Norbert Mucheyer, Rechtenbach; Heinz Schulte, Marktheidenfeld, both of Fed. Rep. of Germany
[73] Assignee: Mannesmann Rexroth GmbH, Fed. Rep. of Germany

[21] Appl. No.: 562,202
[22] Filed: Dec. 16, 1983
[30] Foreign Application Priority Data
Dec. 22, 1982 [DE] Fed. Rep. of Germany ....... 3247420
[51] Int. Cl.[4] ................ F16K 15/18
[52] U.S. Cl. ................ 137/522; 91/52; 137/630.15; 251/28; 251/33; 251/38; 251/63.4; 251/63.5
[58] Field of Search ................ 91/52; 137/522, 523, 137/630.15; 251/28, 33, 38, 63.4, 63.5

[56] References Cited
U.S. PATENT DOCUMENTS 1,402,016 1/1922 Raymond ................ 91/52 X
1,690,766 11/1928 Astle ................ 91/52 X
2,677,417 5/1954 Logan ................ 91/52 X
3,631,887 1/1972 Schlechtriem ................ 137/522
3,631,888 1/1972 Anton ................ 137/522

FOREIGN PATENT DOCUMENTS 2208841 8/1973 Fed. Rep. of Germany .
1056657 3/1954 France ................ 91/52
539068 8/1941 United Kingdom ................ 91/52

*Primary Examiner*—Robert G. Nilson
*Attorney, Agent, or Firm*—Wigman & Cohen

[57] ABSTRACT

A hydraulically unblockable non-return valve has a control piston (21), the control side of which can be connected with a control pressure medium source (35) and the other side of which can be connected with a supply container (33). In order to create a hydraulically unblockable non-return valve, in which the control side of the control piston does not need to be relieved of pressure, the other side of the control piston is perpetually connected with the supply container. Also provided is a throttle bore (27) which connects the two sides of the control piston with each other.

9 Claims, 2 Drawing Figures

HYDRAULICALLY UNBLOCKABLE NON-RETURN VALVE

BACKGROUND OF THE INVENTION

The invention relates to a non-return valve.

In a known non-return valve of the above type the control piston must be relieved of pressure on its control side in order to be able to return to its original position. (Dr. Heinz Zoebl Ölhydraulik Vienna, Springer-Verlag, 1963, page 162).

SUMMARY AND OBJECTS OF THE PRESENT INVENTION

The object of the present invention is to create a hydraulically unblockable non-return valve in which the controlside of the control piston does not need to be separately relieved of pressure. The control pressure present on the control side of the control piston is released when the control pressure medium source supplies less pressure medium to the control side of the control piston than can flow out through the restrictor. If the control side of the control piston is no longer acted upon with pressure medium, then the control pressure medium source is usually blocked and the control pressure produced thereby on the control side of the control piston is released through the restrictor. A loss of pressure medium occurs usually only during the activation of the control piston.

If the pressure medium flow into the supply container through the restrictor during activation of the control piston is too large, a second restrictor can be arranged in front of this restrictor which prevents too rapid a discharge from the pressure medium required for the control. The prevention of rapid pressure medium loss and too rapid pressure drop is particularly of advantage when additional users are connected to the control pressure medium source. If in addition to the first restrictor the second throttle point, when it is arranged in the valve housing, for example, has a certain minimal flow pass through it when the control piston is not activated, then even small movements of the control piston are dampened.

A further embodiment of the invention has an arrangement of the restrictor in the control piston, which results in a savings in expense for the manufacture of the hydraulically unblockable non-return valve.

With the foregoing and other objects, advantages and features of the invention that will become hereinafter apparent, the nature of the invention may be more clearly understood by reference to the following detailed description of the invention, the appended claims and to the several views illustrated in the attached drawings.

BRIEF DESCRIPTION OF THE DRAWINGS

Additional advantages are evident from the specification and the drawings. Schematically shown in the drawings is a hydraulically unblockable non-return valve with servocontrol as an exemplary of the object of the invention.

DETAILED DESCRIPTION OF A PREFERRED EMBODIMENT

Figures 1, 2:
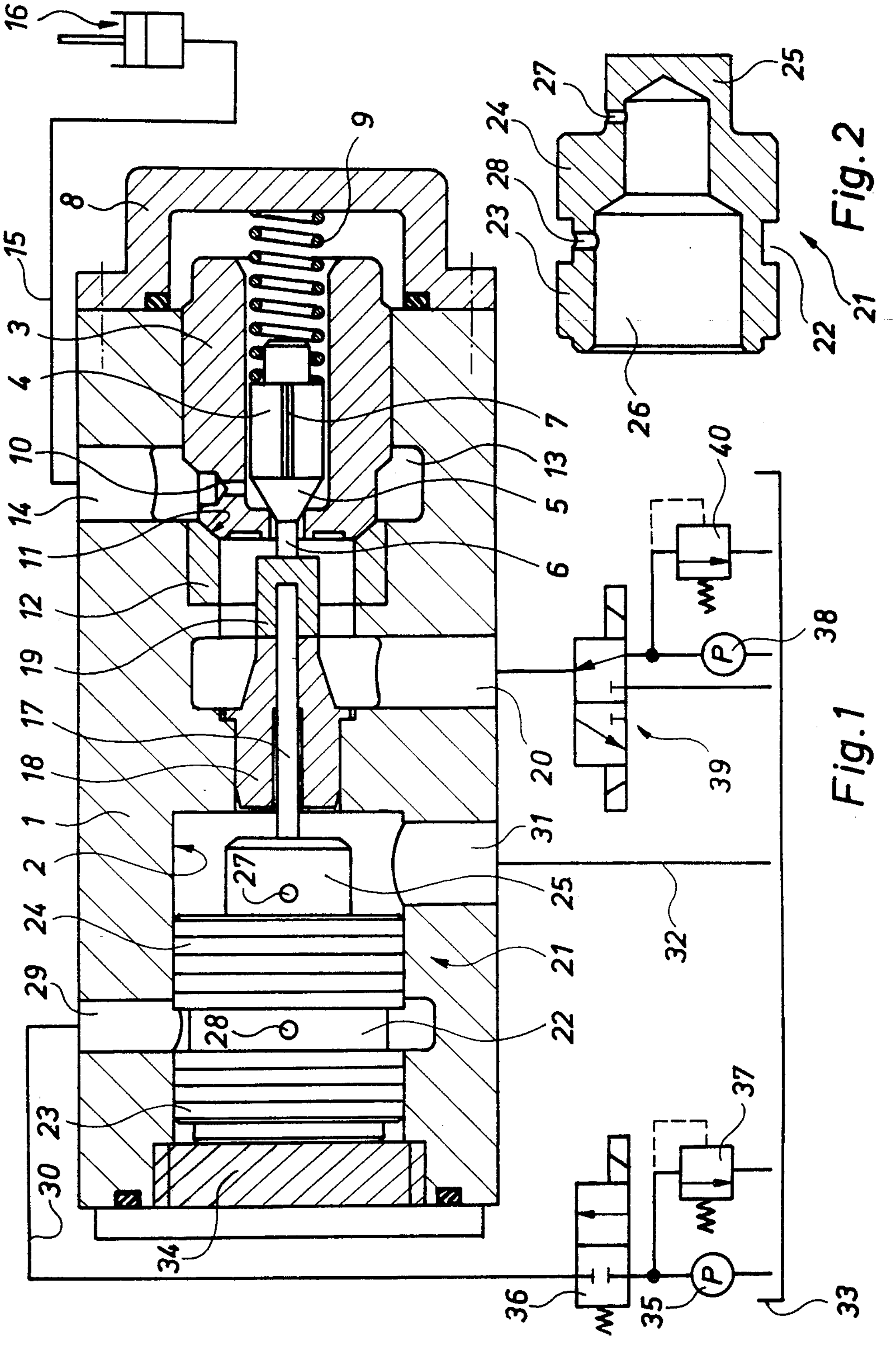
FIG. 1 is a longitudinal cross-section.
FIG. 2 longitudinal cross-section of a portion shown in FIG. 1.

A valve housing 1 has a multiply stepped longitudinal bore 2. A sleeve-like closing member 3 is mounted on the right side of the longitudinal bore 2, as shown in FIG. 1, so as to be axially slidable. A pilot member 4 is arranged coaxially in the closing member 3 and is also mounted so as to be capable of axial movement. The pilot member 4 has a valve member 5, which cooperates with a valve seat in the base of the closing member 3. A pin 6, which penetrates the base of the closing member 3 and which extends beyond the closing member 3, is arranged on the valve member 5. A longitudinal groove 7, which connects the two sides of the pilot member 4 with each other is arranged in the cylindrical portion of the pilot member 4 which slides in the closing member 3. A valve spring 9 is biased between the pilot member 4, and a cover 8 is attached to the valve housing 1 by threaded engagement. The closing member 3 has a restrictor 10 in its cover near its base. The restrictor 10 opens into the area bounded by the valve member 5 of the pilot member 4.

The closing member 3 has a seat element 11, which cooperates with an annular element 12 that is arranged in the longitudinal bore 2 and has a valve seat. In the vicinity of its base, the closing member 3 is surrounded by an annular groove 13 arranged in the valve housing 1 and which is connected with a bore 14 leading to the outside. One side of a simply operating, horizontally arranged operating cylinder 16 is connected to this bore by a line 15.

A ram 17 is arranged coaxially to the closing member 3 in the longitudinal bore 2 so as to be axially slidable in a mounting element 18. The ram 17 includes a head 19 on its side adjacent the closing member 3, which cooperates with the pin 6 located on the pilot member 4. A bore 20 opens into an annular groove in the longitudinal bore 2 in the area between the valve seat 12 and the mounting element 18. The ram 17 projects beyond the mounting element 18 on the side opposite the closing member 3.

On the left side of the ram 17, as shown in the drawing, a control piston 21 is arranged coaxially to the closing member 3. The control piston 21 has two piston elements 23 and 24, which are separated from each other by an annular groove 22, and is mounted so as to be axially slidable in an enlarged portion of the longitudinal bore 2. A projection 25 of smaller diameter is located on the side near closing member 3. The control piston 21 has a stepped blind bore 26 (FIG. 2). The cover of the control piston 21 has a throttle bore 27 which opens into the blind bore 26 in the vicinity of the projection 25. A throttle bore 28 is also arranged in the base of the annular groove 22, and also opens into the blind bore 26. The two throttle bores 27 and 28 are connected with each other by the blind bore 26.

In the closed position of the closing member 3 and the pilot member 4, as shown in the drawing, an annular groove is provided in the valve housing 1 adjacent the annular groove 22. This groove is connected to a bore 29 and to the bore 2. A line 30 is connected to the bore 29. A lateral bore 31 opens into the longitudinal bore 2 between the control piston 21 and the mounting element 18. The lateral bore 31 is connected to a supply container 33 by means of a line 32. The valve housing 1 is closed on the side toward the control piston 21 by a closure screw 34.

A 2/2 directional control valve 36, which can be activated as desired, is engaged between a control pump 35 and the line 30. The pressure side of the pump 35 is protected by a pressure relief valve 37.

A 3/2 directional control valve 39, which can be controlled as desired, is provided between a control pump 38 and the bore 20 and can connect the bore 20 either with the pump 38 or with the supply container 33. The pressure side of the pump 38 is protected by a pressure relief valve 40.

To raise the piston in the operating cylinder 16, as shown, the control pump 38 is connected with the bore 20 by the control valve 39. The pressure supplied by the pump raises first the pilot member 4 and then the closing member 3 away from their respective valve seats. If no additional pressure medium is supplied to the operating cylinder 16, then the bore 20 is connected with the supply container 33 via the pressure limit valve 40. A center position can also be provided by the control slide in the switch valve 39, by means of which position the pump feeds without pressure into the supply container 33.

To lower the piston in the operating cylinder 16, the pilot member 4 and the closing member 3 must be opened. For this purpose the control pump 35 is connected with the bore 29 by means of the switch valve 36, whereby pressure medium flows through the throttle bore 28 into the blind bore 26 of the control piston 21 with a corresponding loss of pressure. Since less pressure medium flows out of the throttle bore 27 than is fed into the throttle bore 28, on the left side of the control piston 21, as shown in FIG. 1, a pressure builds up and the control piston 21 is pushed to the right (of FIG. 1). The control piston 21, by means of the ram 17, opens first the pilot member 4 and then the closing member 3, causing pressure medium to flow from the operating cylinder 16 through the opened valves 3, 4 and the control valve 39, into the supply container 33.

If the closing member 3 and the pilot member 4 are to be closed again, then the control slide of the switch valve 36 is again brought into its closed position, whereby the pump 35 is separated from the bore 29. The pressure of the pressure medium in the line 30, in the bore 29 and in the blind bore 26 drops steadily by means of the throttle bore 27, which constantly is connected with the supply container 33, so that the control piston 21 can be brought back into its original position, as shown in the drawing, by means of the valve spring 9.

During the movement of the control piston 21, the annular groove 22 thereof is always connected with the bore 29.

The throttle bore 28 is advantageously designed such that when pressure medium passes out of the line 30, a pressure loss takes place of up to 20% of the pressure prevailing in the line 30. The purpose of the throttle bore 28 is to decrease the flow of pressure medium leaving from the line 30 during the stroke of the control piston 21, thus preventing brief, severe interruptions in the level of pressure.

The throttle point of the throttle bore 28 can also be housed in the valve housing 1 or in the line 30. If the throttle bore 28 or the throttle point corresponding thereto experiences a certain minimal flow at the beginning of the opening, then even small oscillations of the control piston 21 are dampened.

Although only preferred embodiments are specifically illustrated and described herein, it will be appreciated that many modifications and variations of the present invention are possible in light of the above teachings and within the purview of the appended claims without departing from the spirit and intended scope of the invention.

We claim:

1. A hydraulically unblockable non-return valve comprising:

a valve housing;

a seat element in the valve housing;

closing means movable in the valve housing for cooperating with the seat element;

spring means for holding the closing means against the seat element;

control piston means having a low pressure side and a high pressure side arranged coaxially to the closing means for cooperating with the closing means to open and close the valve;

said housing having a first bore on the low pressure side of the control piston means;

said housing having a second bore which is connected to a control line;

a first throttle means in the control piston means arranged between the high pressure side and low pressure side of the control piston means;

a second throttle means arranged between the control line and the high pressure side of the control piston means; and ram means connected to said piston means for moving said closing means away from the seat element to open the valve;

wherein said control piston means is provided with a blind bore on the high pressure side and the second throttle means is arranged on the control piston means between the second bore and the blind bore.

2. The valve according to claim 1, wherein the second bore is between the two ends of the control piston means.

3. The valve according to claim 2, wherein the control piston means has piston elements on each side of the second bore.

4. A valve, comprising:

a valve housing;

a seat element in the valve housing;

closing means movable in the valve housing for cooperating with the seat element;

spring means for holding the closing means against the seat element;

control piston means having a high pressure side and a low pressure side arranged in the housing coaxially to the closing means;

means for connecting the control piston means to the closing means;

a first throttle means for regulating pressure medium between the high pressure side and the low pressure side of the control piston means; and a second throttle means arranged on the control piston means for regulating pressure medium between a control line and the high pressure side of the control piston means.

5. The valve according to claim 4, wherein said closing means comprises an internal seat element and a pilot member axially movable within said closing means for blocking said internal seat element.

6. The valve according to claim 5, wherein said control piston means is provided with a blind bore on the high pressure side.

7. The valve according to claim 6, wherein the second throttle means is arranged on the control piston means between the second bore and the blind bore.

8. A valve, comprising:

a valve housing;

a seat element in the valve housing;

closing means movable in the valve housing for cooperating with the seat element;

spring means for holding the closing means against the seat element;

control piston means having a high pressure side and a low pressure side arranged in the housing for cooperating with the closing means;

said control piston means having a blind bore in the high pressure end and two parallel sealing rings arranged on the outer perimeter of said control piston means for forming a seal with said housing;

first throttle means arranged in said control piston means between the high pressure side and the low pressure side of the control piston means; and second throttle means arranged between the two sealing rings for connecting a control line to the blind bore of the control piston means.

9. The valve according to claim 8, further comprising means for connecting the control piston means to the closing means.

* * * * *